(12) United States Patent
Jin

(10) Patent No.: US 10,984,371 B2
(45) Date of Patent: Apr. 20, 2021

(54) EXPRESS PACKAGE DELIVERY

(71) Applicant: Advanced New Technologies Co., Ltd., George Town (KY)

(72) Inventor: Wenbin Jin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/717,440

(22) Filed: Dec. 17, 2019

(65) Prior Publication Data

US 2020/0126034 A1    Apr. 23, 2020

Related U.S. Application Data

(63) Continuation of application No. 15/888,617, filed on Feb. 5, 2018.

(30) Foreign Application Priority Data

Feb. 7, 2017    (CN) .......................... 201710066462.7

(51) Int. Cl.
*G06Q 10/08* (2012.01)
*G06F 16/29* (2019.01)
*G06F 16/9537* (2019.01)

(52) U.S. Cl.
CPC ......... *G06Q 10/0833* (2013.01); *G06F 16/29* (2019.01); *G06F 16/9537* (2019.01); *G06Q 10/08* (2013.01)

(58) Field of Classification Search
CPC ..................................................... G06Q 10/08
See application file for complete search history.

(56) References Cited

U.S. PATENT DOCUMENTS 6,725,127 B2    4/2004  Stevens
8,725,165 B2    5/2014  Lau et al.
(Continued)

FOREIGN PATENT DOCUMENTS

CN    102708475    10/2012
CN    103729790    4/2014
(Continued)

OTHER PUBLICATIONS

Vaculik et. al., Applications of EPC Standards and Mobile Networks Services to Enhance the Quality of Postal Service, (2015), Transport and Telecommunication Journal, vol. 16 No. 1, p. 50 (Year: 2015).*
(Continued)

*Primary Examiner* — Kevin H Flynn
*Assistant Examiner* — Jesse L Silvernail
(74) *Attorney, Agent, or Firm* — Fish & Richardson P.C.

(57)    ABSTRACT

An express package delivery request is received from a courier terminal that indicates identifier information of a courier and first positioning information corresponding to a location of the courier. The express package delivery content information corresponding to a recipient address is retrieved from a database. The identifier information of the courier and the first positioning information corresponding to the location of the courier is determined to be within proximity to the retrieved recipient address. The second positioning information of a recipient that can receive an express package is determined corresponding to an account in the retrieved express package delivery content information. A notification is provided to the courier terminal to deliver the express package identified in the express package delivery request if the determined second positioning information of the recipient coincides with the retrieved recipient address.

14 Claims, 12 Drawing Sheets

(56) References Cited

U.S. PATENT DOCUMENTS

| | | | |
|---|---|---|---|
| 9,652,731 | B2 | 5/2017 | Shucker et al. |
| 2002/0162883 | A1 | 11/2002 | Arvonio et al. |
| 2014/0087772 | A1* | 3/2014 | Papa ................ G06Q 50/28 455/466 |
| 2015/0081399 | A1* | 3/2015 | Mitchell ............ G08G 1/0129 705/7.38 |
| 2015/0178778 | A1 | 6/2015 | Lee et al. |
| 2016/0171427 | A1 | 6/2016 | Cao |
| 2016/0247344 | A1 | 8/2016 | Eichenblatt |
| 2016/0314429 | A1* | 10/2016 | Gillen ............... G06Q 10/0833 |
| 2017/0147974 | A1* | 5/2017 | Pandey ............. G06Q 10/0832 |
| 2017/0323545 | A1* | 11/2017 | Gillen ............... G06Q 50/30 |
| 2018/0182019 | A1* | 6/2018 | Jiang ................ G06Q 30/0222 |
| 2018/0225627 | A1 | 8/2018 | Jin |

FOREIGN PATENT DOCUMENTS

| | | |
|---|---|---|
| CN | 103793801 | 5/2014 |
| CN | 104885110 | 9/2015 |
| CN | 106296058 | 1/2017 |
| JP | 2002255351 | 9/2002 |
| JP | 2003123004 | 4/2003 |
| JP | 2010092398 | 4/2010 |
| JP | 2012206842 | 10/2012 |
| JP | 2012252619 | 12/2012 |
| JP | 2013133210 | 7/2013 |
| JP | 2014026557 | 2/2014 |
| KR | 20040078354 | 9/2004 |
| TW | 200816076 | 4/2008 |
| TW | 201629899 | 8/2016 |
| WO | WO 2016031027 | 3/2016 |
| WO | WO 2016193964 | 12/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/US2018/017076, dated Aug. 13, 2019, 8 pages.

PCT International Search Report and Written Opinion in International Application No. PCT/US2018/017076, dated Aug. 5, 2018, 10 pages.

\* cited by examiner

EXPRESS PACKAGE DELIVERY

This application is a continuation of U.S. patent application Ser. No. 15/888,617, filed on Feb. 5, 2018, which claims priority to Chinese Patent Application No. 201710066462.7, filed on Feb. 7, 2017, and each application is hereby incorporated by reference in its entirety.

BACKGROUND

In modern life, many people prefer to buy goods through online shopping. An e-commerce company can implement home delivery of goods through a courier company after receiving an order of the goods from a user.

In many cases, during a home delivery, a courier needs to call a recipient to confirm whether a recipient is available at a home to receive a delivery. If no one is home to receive delivery of the goods, the courier can set up an appointment with the recipient to deliver the goods and complete the delivery. In this scenario, the cost of communication between the courier and the recipient is increased due to multiple communications (that is, confirming availability of the recipient, setting up an appointment, and delivering the goods. In other implementations, if the recipient cannot receive the goods at home, the recipient may instruct the courier to deliver the goods to a specified location (for example, a secure locker). However, this implementation can cause issues as the recipient may not receive any confirmation once the courier delivers the goods to the specified location.

SUMMARY

The present disclosure describes express package delivery.

In an implementation, an express package delivery request is received from a courier terminal that indicates identifier information of a courier and first positioning information corresponding to a location of the courier. The express package delivery content information corresponding to a recipient address is retrieved from a database. The identifier information of the courier and the first positioning information corresponding to the location of the courier is determined to be within proximity to the retrieved recipient address. The second positioning information of a recipient that can receive an express package is determined corresponding to an account in the retrieved express package delivery content information. A notification is provided to the courier terminal to deliver the express package identified in the express package delivery request if the determined second positioning information of the recipient coincides with the retrieved recipient address.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. The cost of communication between a recipient and a courier is reduced and delivery efficiency of the courier to the recipient is enhanced. The recipient also enjoys receiving express packages at home.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes an express package sending method and apparatus and an electronic device for reducing the cost of communication between a courier and a recipient, enhancing the delivery efficiency, and meanwhile enabling the recipient to enjoy the experience of receiving express packages at home. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In some implementations, the described subject matter can be used to improve a service process of sending an express package. Specifically, a courier delivers the express package at a specified home delivery time determined through communication between the courier and a recipient. Alternatively, the express package can be sent directly to a specified secure location (for example, a locker) without telephone communication between the courier and the recipient.

The detailed description describes a process of delivering an express package to a recipient by use of a courier. The description describes that the recipient who receives an express package can have a position attribute. If an acquired position of the recipient is determined to coincide with a recipient address, this can be used to indicate that there is at least one recipient who can receive an express package at the recipient address.

At this time, a notification for home delivery of an express package is transmitted to a courier. The notification includes information including the recipient address, such that the courier can effectively deliver the express package to the recipient. In this manner, it is unnecessary to communicate in advance with the recipient (for example, by telephone) about a package delivery time, saving a cost of communication, and a need to deliver the express package to a specified secure location. As a result, it is easier for a recipient to receive express packages at home.

Figure 1:
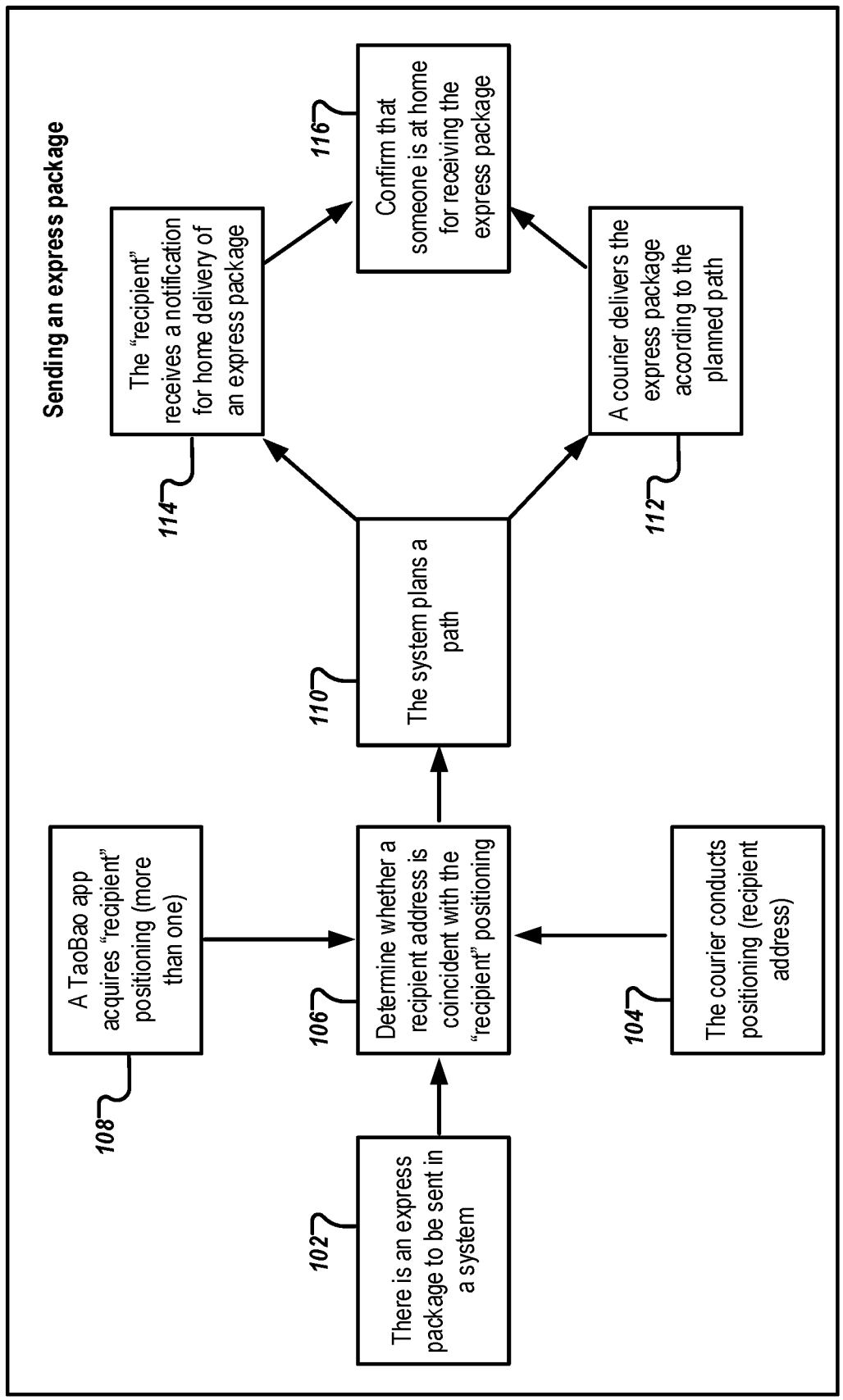
FIG. 1 is a flowchart illustrating an example of a method for express package delivery, according to an implementation of the present disclosure.

FIG. 1 is a flowchart illustrating an example of a method 100 for express package delivery, according to an implementation of the present disclosure.

At 102, the system 100 determines that an express package is in a system and needs to be sent to a recipient. From 102, the method 100 proceeds to 106.

At 104, the courier conducts positioning of his/her location. From 104, the method 100 proceeds to 106.

At 106, the system 100 determines whether there is a recipient address requiring delivery of an express package at a position near the courier. A determination is made as to whether the courier position is coincident with the recipient position. In addition, the system 100 reads a recipient address from a database. From 106, the method 100 proceeds to 110.

At 108, the system 100 acquires position information of a recipient (or multiple recipients) that can receive a corresponding express package through an application. For example, the application can include a TAOBAO application, where the positioning information of the recipient is determined in real-time. The positioning information can be constantly updated along with position changes of the recipient, and the positioning information can be acquired by sending a positioning request to a terminal such as a mobile device that includes the TAOBAO application. For example, other applications include CAINIAO, TAOBAO, ALIBABA, COURIER or another e-commerce application. From 108, the method 100 proceeds to 106.

At 110, the system determines whether the recipient address coincides with the acquired positioning information of the recipient. If the recipient address and the acquired positioning information of the recipient is identified and it was determined that the positions are coincident, the system 100 plans a path for the courier to deliver an express package to the recipient. In addition, the system 100 transmits the planned path to the courier. At 112, the courier delivers the express package to a specified recipient address accurately and quickly according to the planned path delivered by the system 100. From 112, the method 100 proceeds to 116.

At the same time, at 114, the system may also send a notification of home delivery of an express package to the recipient to ensure that someone at home can sign for the express package when the courier delivers the express package to the door. From 114, the method 100 proceeds to 116.

At 116, the system 100 receives an indication from the recipient (for example, through use of an application executing on a mobile computing device) that someone is at home for receiving the express package. After 116, the method 100 stops.

Figure 2A:
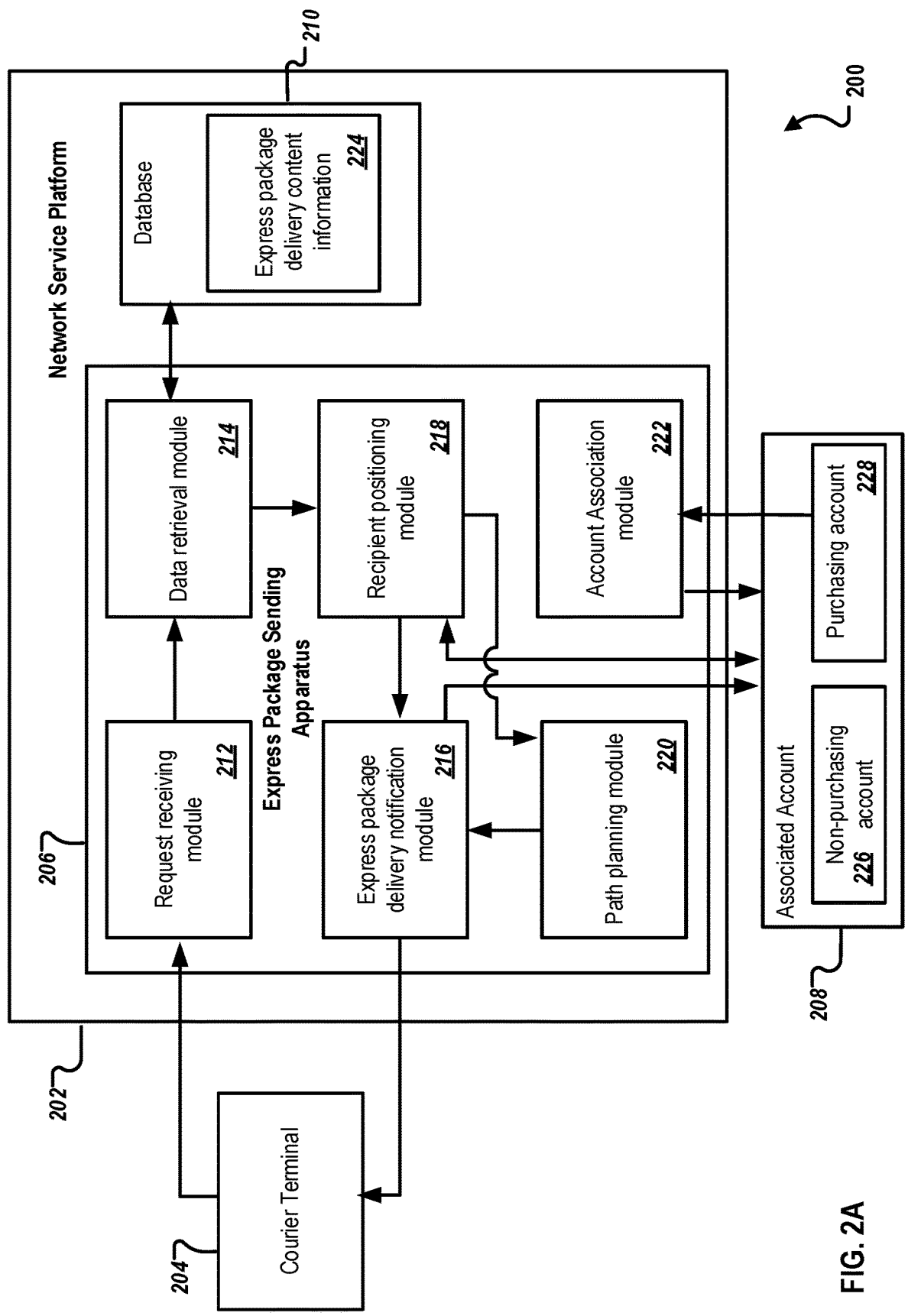
FIG. 2A is a block diagram illustrating an example of a system for express package delivery, according to an implementation of the present disclosure.

FIG. 2A is a block diagram illustrating an example of a system 200 for express package delivery, according to an implementation of the present disclosure. The system 200 illustrates a network service platform 202, a courier terminal 204, and associated accounting 208. In one example, the network service platform 202 may be a shopping platform, for example. The network service platform 202 may be provided with an express package sending apparatus 206 for executing the courier's process of executing the express package sending method. The network service platform 202 includes an express package sending apparatus 206 and a database 210, wherein the express package sending apparatus 206 further includes a request receiving module 212, a data retrieval module 214, a recipient positioning module 218, an express package delivery notification module 216, a path planning module 220, and an account association module 222. The database 210 includes express package delivery content information 224. The associated accounting module 208 includes a non-purchasing account 226 and a purchasing account 228.

In some implementations, the request receiving module 212 is configured to receive an express package delivery request sent by a courier terminal, the express package delivery request including identifier information of a courier and first positioning information indicating a position where the courier is located. The identifier information of the courier may be a number of the courier for distinguishing the identity of the courier. The first positioning information may be positioning information generated through positioning by a GPS positioning module built into the courier terminal 204, and the positioning information may be constantly changed with the movement of the courier. The express package delivery request is used for requesting the express package sending apparatus to issue a notification for home delivery of an express package to a current courier according to the position of the current courier.

The data retrieval module 214 is configured to retrieve, from a database 210, express package delivery content information corresponding to a recipient address is within a configured proximity of the position of the located courier according to the identifier information of the courier and the first positioning information, the database 210 stores multiple pieces of express package delivery content information, and each of the multiple pieces of express package delivery content information including identifier information of a courier, information of a recipient address, and information of an account associated with the recipient address. The identifier information of the courier is used for distinguishing the identity of the courier, and the information of the account associated with the recipient address relates to one or more associated accounts set in an associated manner for the recipient address of the purchased commodity when the purchasing account places an order for the commodity. These associated accounts may include the purchasing account itself, or other non-purchasing accounts. The purpose of setting these associated accounts is to receive express packages by taking users corresponding to these associated accounts as recipients when the courier delivers the express packages to the recipients. The data retrieval module 214 retrieves, from the database 210, the express package delivery content information corresponding to the recipient address matching the position of the courier in the first positioning information according to the first positioning information of the courier.

The recipient positioning module 218 is configured to position, according to the information of the associated account 208 in the retrieved express package delivery content information and from a terminal logging into the associated account, second positioning information of a recipient who can currently receive an express package. The recipient may be an actual user corresponding to the associated account 208, and the second positioning information is positioning information of a recipient who can receive an express package, the positioning information being acquired by the system from the terminal logging into these accounts through the information of the associated account 208 information, that is, the positioning information of the actual user corresponding to the associated accounts.

The express package delivery notification module 216 is configured to send a notification for home delivery of the express package to the courier terminal 204 if the second positioning information is coincident with the information of the recipient address, the notification including the information of the recipient address. Coincidence between the second positioning information and the information of the recipient address can be appreciated as that geographical regions corresponding to the second positioning information and the information of the recipient address are consistent with one another. For the courier, a geographical region corresponding to the second positioning information taken as a target location of the express package delivery is not different from the recipient address.

In some implementations, the second positioning information is coincident with the information of the recipient address. For instance, the recipient address can be covered in a preset range corresponding to the second positioning information. In addition, a recipient may include one or more accounts. For example, one delivery address can correspond to multiple online shipping accounts in the same e-commerce application, such as TAOBAO. Owners of different accounts linked to the same delivery address may know each other and trust each other. In some implementations, when at least of the account owners is located at that particular delivery address (using the second positioning information), the system assumes that an individual is located at that particular address and can receive/accept the delivery package. In some implementations, the recipient positioning module 218 may further include a positioning sending unit and a positioning receiving unit. The recipient positioning module 218 is configured to position, according to the information of the associated account in the retrieved express package delivery content information and from a terminal logging into the associated account 208, second positioning information of a recipient who can currently receive an express package. This positioning may include: the positioning sending unit configured to send a positioning request to the terminal logging into the associated account 208, to acquire positioning information of a position where the terminal logging into the account is currently located. In some implementations, the positioning receiving unit is configured to receive the positioning information returned by the terminal logging into the associated account, and using the positioning information as the second positioning information of the recipient who can currently receive the express.

In some implementations, the express package sending apparatus 206 includes a path planning module 220. The path planning module 220 configured to generate information of a planned path of this express package delivery according to the first positioning information and the information of the recipient address after it is determined that the second positioning information is coincident with the information of the recipient address. In addition, a planned path starting from the position where the courier is located is determined, that is, from the position corresponding to the first positioning information, and terminating at the recipient address.

The express package delivery notification module may be further configured to send the information of the planned path to the courier terminal 204, such that the courier can reach the recipient address quickly and accurately.

The express package delivery notification module 216 may further be configured to, after sending the notification for home delivery of the express package to the courier terminal 204, extract, from the second positioning information, second positioning information closest to a geographical position of the information of the recipient address, and transmit the notification for home delivery of an express package to the terminal acquiring the second positioning information through positioning to inform the actual user corresponding to the associated account 208 located at the recipient address to wait for the arrival of the express package from the courier.

In addition, the express package sending apparatus 206 includes an account association module 208. The account association module 208 is configured to take, on a purchasing account 228 of the express package and in response to an operation of setting one or more accounts other than the purchasing account 228 for the recipient address in an associated manner, the purchasing account 228 and each of the other accounts, respectively, as the account associated with the recipient address. For example, when the purchasing account 228 is at a specified recipient address, one or more accounts other than the purchasing account 228 are set for the recipient address in an associated manner. At this time, the other accounts and the purchasing account may be stored locally as the accounts associated with the recipient address, and when a network service platform 202 sends a corresponding express package, the recipient address and the associated accounts are stored in a database 210 for facilitating the retrieval of the data retrieval module 214.

The express package sending apparatus 206 retrieves, from a database 210, express package delivery content information corresponding to a recipient address matching the position where a courier is located according to identifier information of a courier and first positioning information after receiving an express package delivery request sent by a courier terminal 204. The express package sending apparatus 206 acquires second positioning information through positioning according to information of the associated account in the express package delivery content information, and issues a notification for home delivery of an express package according to whether the second positioning information is coincident with information of the recipient address. In this manner, the notification for home delivery of an express package can be accurately issued according to a real-time position of the courier. In one applicable scenario, the previously mentioned process can be simplified to include only acquiring the second positioning information through positioning according to the information of the associated account in the express package delivery content information and issuing notification for home delivery of an express package. This issuance of notification for home delivery of an express package according to whether the second positioning information is coincident with the information of the recipient address. This implements the objective of notifies the courier to deliver the express package to the door, without paying attention to the current position of the courier.

In some implementations, the recipient positioning module 218 is configured to position, according to information of an associated account in express package delivery content information stored in a database 210 and from a terminal logging into the associated account 208, second positioning information of a recipient who can currently receive an express package. The database 210 stores multiple pieces of express package delivery content information and each of the multiple pieces of express package delivery content information including identifier information of a courier, information of a recipient address, and information of an account associated with the recipient address.

In some implementations, the express package sending apparatus 206, the recipient positioning module 218 no longer positions the second positon information according to the express package delivery request sent by the courier terminal 204, but directly positions the second position information according to the express package delivery content information currently stored in the database 210.

The express package delivery notification module 216 is configured to send a notification for home delivery of the express package to courier terminal 204 according to identifier information of a courier if the second positioning information is coincident with information of a recipient address, the notification including the information of the recipient address. After identifying that there is second positioning information being coincident with the information of the recipient address, the express package sending apparatus sends a notification for home delivery of the express package to the courier terminal 204 according to the identifier information of the courier. As a result, the step of issuing the notification is simplified.

Figure 2B:
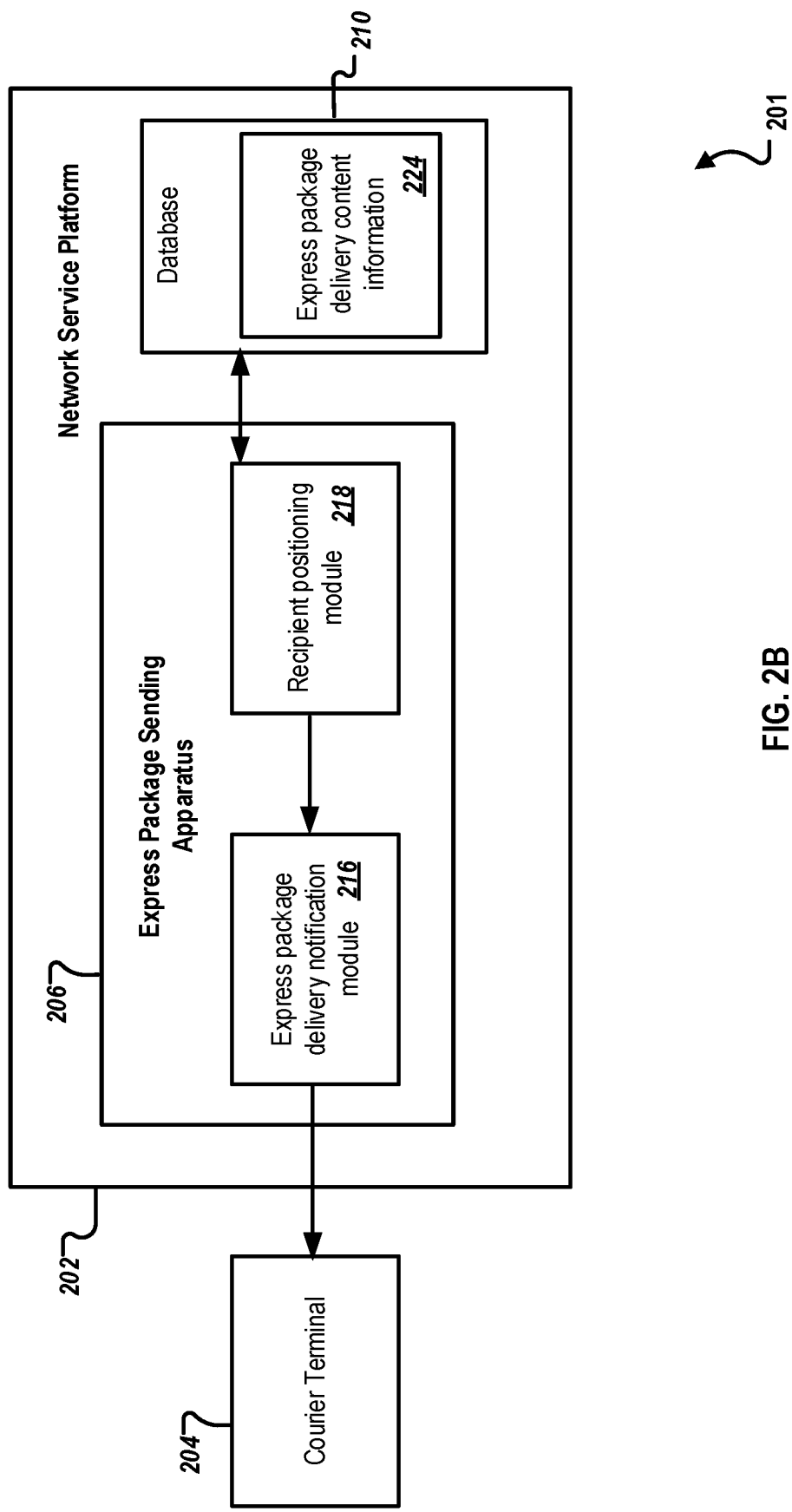
FIG. 2B is another block diagram illustrating an example of a system for express package delivery, according to an implementation of the present disclosure.

FIG. 2B is another block diagram illustrating an example of a system 201 for express package delivery, according to an implementation of the present disclosure. In some implementations, the system 201 simplifies the express package sending apparatus. That is, the express package sending apparatus 206 in FIG. 2B includes a recipient positioning module 218 and an express package delivery notification module 216.

The recipient positioning module 218 is configured to position, according to information of an associated account in express package delivery content information 224 stored in a database 210 and from a terminal logging into the associated account, second positioning information of a recipient who can currently receive an express package, the database storing multiple pieces of express package delivery content information 224, and each of the multiple pieces of express package delivery content information 224 including identifier information of a courier, information of a recipient address, and information of an account associated with the recipient address. In the simplified express package sending apparatus 206 of FIG. 2B, the recipient positioning module 218 no longer positions the second position information according to the express package delivery request sent by the courier terminal, but directly positions the second position information according to the express package delivery content information 224 stored in the database currently.

The express package delivery notification module 216 is configured to send a notification for home delivery of the express package to a courier terminal 204 according to identifier information of a courier if the second positioning information is coincident with information of a recipient address, the notification including the information of the recipient address. After identifying that there is second positioning information being coincident with the information of the recipient address, the express package sending apparatus 206 sends a notification for home delivery of the express package to the courier terminal 204 according to the identifier information of the courier, thereby simplifying the step of issuing the notification.

Further, the express package sending apparatus 206 simplified in FIG. 2B may further include a path planning module 220, an account association module 222, and other modules, for implementing similar functions of the express package sending apparatus in FIG. 2A.

Figure 3A:
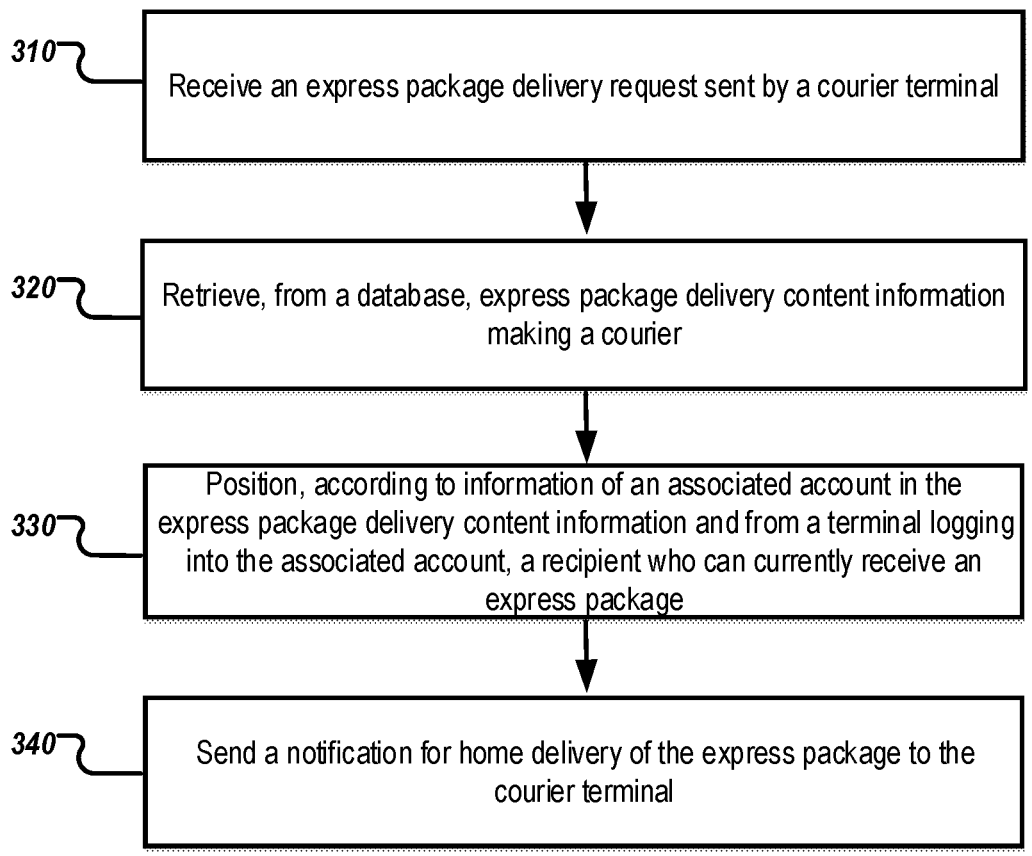
FIG. 3A is another flowchart illustrating an example of a method for express package delivery, according to an implementation of the present disclosure.

FIG. 3A is a flowchart illustrating an example of a method 300 for express package delivery, according to an implementations of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, the express package sending apparatus 206 receives the express package delivery request sent by a courier terminal 204. The express package delivery request includes identifier information of a courier and first positioning information indicating a position where the courier is located. Specifically, a courier may carry a courier terminal 204 when delivering an express package. The courier terminal 204 can be a mobile device such as a mobile phone that includes a positioning function. The courier terminal 204 may collect, in real-time, positioning information of the position where the courier is located, that is, the first positioning information, and report identifier information of the courier and the first positioning information to the express package sending apparatus 206 by sending an express package delivery request. In one example, the courier may control the courier terminal 204 to send an express package delivery request to the express package sending apparatus 206, or the courier terminal 204, in the process of collecting the first positioning information, sends an express package delivery request to the express package sending apparatus on a periodic basis. From 310, method 300 proceeds to 320.

At 320, the express package sending apparatus 206 retrieves express package delivery content information corresponding to a recipient address matching a position where a courier is located from a database 210. The express package delivery content information is retrieved according to the identifier information of the courier and the first positioning information. The database 210 stores multiple pieces of express package delivery content information, and each of the multiple pieces of express package delivery content information includes identifier information of a courier, information of a recipient address, and information of an account associated with the recipient address.

In particular, in order to send a notification accurately for home delivery of an express package to a courier terminal 204, a database 210 is set in a network service platform 202 in advance for express package delivery tasks to be completed every day. The database 210 stores multiple pieces of express package delivery content information that have not yet been delivered to the door on the same day, and each piece of express package delivery content information includes identifier information of a courier corresponding to the express package, information of a recipient address, and information of an account associated with the recipient address. The information of an account associated with the recipient address may be a purchasing account 228 for purchasing express commodities, and may also be other non-purchasing accounts 226 actively added by the purchasing account in an action bar of the recipient address. For example, with an application such as TAOBAO, when a recipient address is set for a TAOBAO account A, a TAOBAO account B, and a TAOBAO account C, serving as other non-purchasing accounts 226, are set together with the TAOBAO account A as associated accounts of the recipient address. The purpose of this is to facilitate a courier to deliver express packages to the door by taking actual users corresponding to the TAOBAO account A, the TAOBAO account B, and TAOBAO account C, respectively, as a recipient who receives the express packages. This implements the signing for the express packages. In one example, the actual users corresponding to the TAOBAO account B and the TAOBAO account C are familiar with the actual user corresponding to the TAOBAO account A. Thus, they can receive express packages for the latter conveniently.

After the express package delivery request is received, the express package sending apparatus 206 retrieves the express package delivery content information corresponding to the recipient address matching the position where the courier is located from the database 210. The express package sending apparatus 206 retrieves the express package delivery content information according to the identifier information of the courier and the first positioning information carried in the express package delivery request.

For instance, the number of the courier is taken as the identifier information of the courier. This number can be the telephone number of the courier terminal 204. The express package sending apparatus 206 retrieves the express package delivery content information corresponding to the recipient address matching the position where the courier is currently located (the position corresponding to the first positioning information) and having the same number as the courier in the current express package delivery request. Thus, matching the position where the courier is located currently can be appreciated as a distance to the position where the courier is located to less than fixed distance range, such as for example, less than 100 meters. From 320, method 300 proceeds to 330.

At 330, the express package sending apparatus 206 determines the second positioning information of a recipient who can currently receive an express package positioned according to the information of the associated account in the retrieved express package delivery content information and from a terminal logging into the associated account 208.

In particular, the express package sending apparatus 206 extracts the information of the accounts associated with the recipient address from the retrieved express package delivery content information, and the actual users corresponding to these associated accounts can be taken as the recipients of the express package corresponding to the recipient address. By using these associated accounts, the recipients who can current receive express packages, such as the actual users corresponding to these associated accounts are positioned, to acquire the second positioning information of these recipients.

For example, the terminals logging into these associated accounts are positioned to acquire the positioning information of the recipients and the positioning information is taken as the second positioning information. From 330, method 300 proceeds to 340.

At 340, a notification for home delivery of an express package is sent to the courier terminal 204 if the second positioning information is coincident with the information of the recipient address, the notification including the information of the recipient address. The coincidence between the second positioning information and the information of the recipient address can be appreciated as that of a geographical region corresponding to the second positioning information is coincident with the recipient address, or the recipient address is covered within a preset range corresponding to the second positioning information. For example, geographical information, such as a circular region, taking a position corresponding to the second positioning information as a circle center with a radius of at least 100 meters.

If the second positioning information coincides with the information corresponding to the recipient address, this indicates that a recipient exists who can sign for receipt of an express package at the recipient address. Thus, a notification for home delivery of an express package is sent to the courier terminal 204, the notification including the information of the recipient address, for notifying the courier to deliver the express package to the door of the recipient's household in time. Further, the express package sending apparatus 206 interprets the coincidence between the second positioning information and the information of the recipient address such that the recipient address is covered in a preset range corresponding to the second positioning information. In addition, one or more may be associated with the recipient address.

In the step of positioning, according to the information of the associated account in the retrieved express package delivery content information and from a terminal logging into the associated account, second positioning information of a recipient who can currently receive an express package may include the following: (i) sending a positioning request to the terminal logging into the associated account, to acquire positioning information of a position where the terminal logging into the account is currently located, and (ii) receiving the positioning information returned by the terminal logging into the associated account, and using the positioning information as the second positioning information of the recipient who can currently receive the express package.

In particular, after the express package sending apparatus 206 sends the positioning request to the terminal logging into the associated account 208, if the associated account 208 is currently in an on-line login state, and the login user finds the positioning request and allows positioning, the terminal executes an operation of acquiring the current position information of the terminal, and returns the positioning information to the express package sending apparatus. After receiving the positioning information, the express package sending apparatus determines the positioning information as the second positioning information of the recipient (the actual user corresponding to the associated account 208) who can currently receive an express package.

After the express package sending apparatus 206 determines that the second positioning information is coincident with the information of the recipient address, the express package sending apparatus 206 generates information of a planned path for this express package delivery according to the first positioning information and the information of the recipient address. In return, the express package sending apparatus 206 transmits the information of the planned path to the courier terminal 204. The information of the planned path may be displayed on the courier terminal 204 in a map mode or a text mode, in some examples.

After the express package sending apparatus 206 sends the notification for home delivery of an express package to the courier terminal 204, the express package sending apparatus 206 extracts the second positioning information with a geographical position closest to the information of the recipient address from the second positioning information. As a result, the express package sending apparatus 206 transmits the notification for home delivery of an express package to the terminal acquiring the second positioning information through positioning.

In some implementations, when the recipient address corresponds to the information of multiple associated accounts, and when second positioning information of multiple recipients who can receive express packages is acquired from the terminal logging into the account according to the information of these associated accounts, the express package sending apparatus 206 extracts second positioning information with a geographical position closest to the information of the recipient address from the second positioning information, and the express package sending apparatus 206 sends the notification for home delivery of an express package to the terminal acquiring the second positioning information through positioning. As a result, the recipients are reminded that there are express packages at the recipient address that need to be signed for, such that it is ensured that someone is at the recipient address to sign for the express package when the courier delivers the package to the door.

Further, on a purchasing account of the express package and in response to an operation of setting one or more other accounts other than the purchasing account for the recipient address in associated manner, the purchasing account 208 and each of the other accounts are respectively taken as the account associated with the recipient address.

For example, when a recipient address is set for a TAOBAO account A, a TAOBAO account B, and a TAOBAO account C, serving as other non-purchasing accounts 226, are set together with the TAOBAO account A as associated accounts of the recipient address. The purpose of such setting is to facilitate a courier to deliver express packages to the door by taking actual users corresponding to the TAOBAO account A, the TAOBAO account B, and the TAOBAO account C respectively, as a recipient who receives the express packages. This allows for the signing for the express packages. The actual users corresponding to the TAOBAO account B and the TAOBAO account C know the actual user corresponding to the TAOBAO account A, and can receive express packages.

In some implementations, after the operation of identifying that the purchasing account 228 is an account associated with the recipient address, the express package sending apparatus 206 sets the associated accounts including the purchasing account 228 and other non-purchasing accounts 226 together as the accounts associated accounts for the recipient address. Additionally, the express package sending apparatus 206 stores in advance the associated accounts into a database 210 when delivering the corresponding express packages, to form the express package delivery content information 224.

The express package sending method includes receiving an express package delivery request sent by a courier terminal 204. The express package delivery request includes identifier information of a courier and first positioning information. The express package sending apparatus 206 retrieves from a database 210 express package delivery content information corresponding to a recipient address matching the position where the courier is located. The database 210 stores multiple pieces of express package delivery content information, and each of the multiple pieces of express package delivery content information include identifier information of a courier, information of a recipient address, and information of an account associated with the recipient address. The express package sending apparatus 206 positions, according to the information of the associated account in the retrieved express package delivery content information and from a terminal logging into the associated account, second positioning information of a recipient who can currently receive an express package. The express package sending apparatus 206 sends a notification for home delivery of the express package to the courier terminal 204 if the second positioning information coincides with the information of the recipient address. The notification includes the information of the recipient address. Thus, the cost of communication between a courier and a recipient is reduced, the efficiency of delivery is enhanced, and the recipient is able to enjoy receiving express packages at home.

Figure 3B:
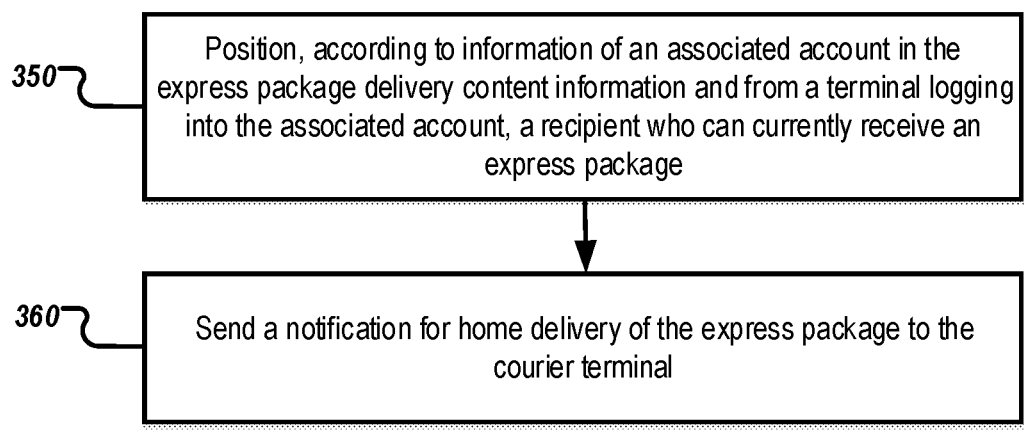
FIG. 3B is another flowchart illustrating an example of a method for express package delivery, according to an implementation of the present disclosure.

FIG. 3B is a flowchart illustrating an example of a method 301 for express package delivery, according to an implementation of the present disclosure. For clarity of presentation, the description that follows generally describes method 301 in the context of the other figures in this description. However, it will be understood that method 301 can be performed, for example, by any system, environment, software, and hardware, or a combination of systems, environments, software, and hardware, as appropriate. In some implementations, various steps of method 300 can be run in parallel, in combination, in loops, or in any order.

At 350, second positioning information of a recipient who can currently receive an express package is positioned according to information of an associated account in express package delivery content information 224 stored in a database 210 and from a terminal logging into the associated account, the database storing multiple pieces of express package delivery content information 224, and each of the multiple pieces of express package delivery content information 224 including identifier information of a courier, information of a recipient address, and information of an account associated with the recipient address.

Specifically, information of the associated accounts may be extracted from each piece of the express package delivery content information 224 in the database 210, and actual users corresponding to these associated accounts can all be taken as recipients of express packages corresponding to the recipient address in the express package delivery content information 224. Then, by using these associated accounts, the recipients who can currently receive express packages, that is, the actual users corresponding to these associated accounts are positioned, to acquire the second positioning information of these recipients. For example, the terminals logging into these associated accounts are positioned, to acquire the positioning information of the recipients, and the positioning information is taken as the second positioning information. From 350, method 301 proceeds to 360.

At 360, a notification for home delivery of an express package is sent to the courier terminal according to the identifier information of the courier if the second positioning information is coincident with the information of the recipient address, the notification including the information of the recipient address.

Coincidence between the second positioning information and the information of the recipient address can be appreciated as that a geographical region corresponding to the second positioning information is consistent with the recipient address, or the recipient address is covered in a preset range corresponding to the second positioning information (for example in a circular region taking a position corresponding to the second positioning information as a circle center, and having a radius of 100 meters).

If the second positioning information is coincident with the information of the recipient address, it indicates that there is a recipient who can sign for an express package at the recipient address. At this time, a notification for home delivery of an express package is sent to the courier terminal, the notification including the information of the recipient address, for notifying the courier to deliver the express package to the door in time.

The express package sending method 301 provided by this embodiment is a simplification of the steps of the method shown in FIG. 3A, which includes directly positioning, according to information of an associated account in each piece of express package delivery content information 224 in a database 210 and from a terminal logging into the associated account, second positioning information of a recipient who can currently receive an express package, and sending a notification for home delivery of the express package to the courier terminal 204 according to the identifier information of the courier if the second positioning information is coincident with the information of the recipient address, the notification including the information of the recipient address. The cost of communication between a courier and a recipient is thereby reduced, the delivery efficiency is enhanced, and the recipient is able to enjoy receiving express packages at home.

Figure 4:
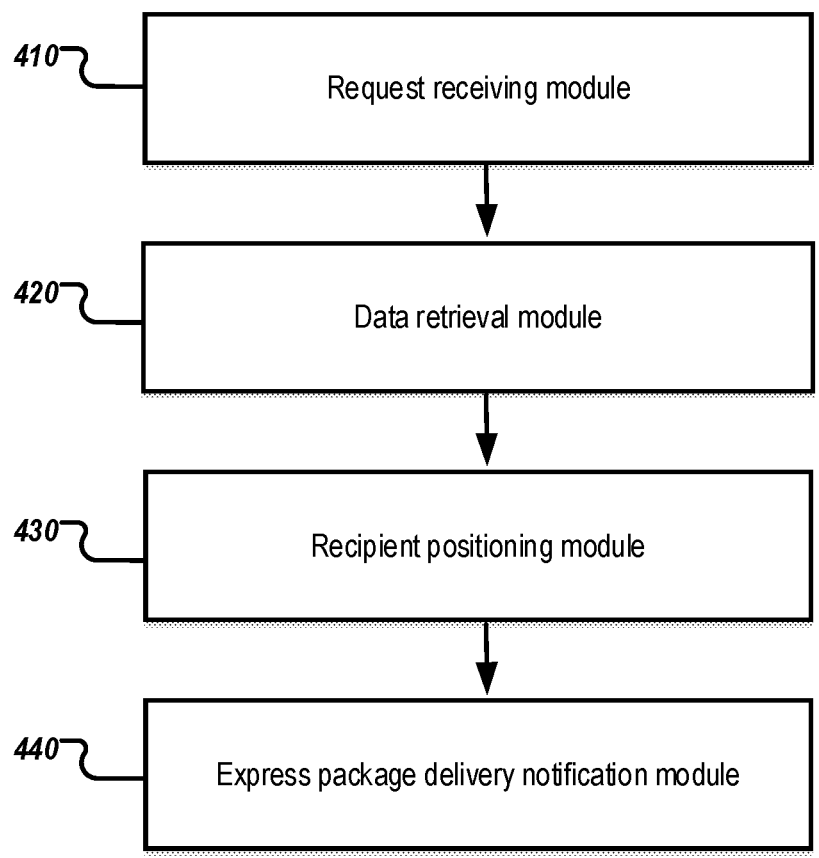
FIG. 4 is another block diagram illustrating an example of a system for express package delivery, according to an implementation of the present disclosure.
Figure 4:

FIG. 4 is another block diagram illustrating an example of a system 400 for express package delivery, according to an implementation of the present disclosure. The system 400 includes a request receiving module 410, a data retrieval module 420, a recipient positioning module 430, and an express package delivery notification module 440.

In some implementations, a request receiving module 410 is configured to receive an express package delivery request sent by a courier terminal 204. The express package delivery request includes an identifier information of a courier and first positioning information indicating a position where the courier is located.

In some implementations, a data retrieval module 420 is configured to retrieve, from a database 210, express package delivery content information corresponding to a recipient address matching the position where the courier is located according to the identifier information of the courier and the first positioning information. The database 210 stores multiple pieces of express package delivery content information, and each of the multiple pieces of express package delivery content information includes identifier information of a courier, information of a recipient address, and information of an account associated with the recipient address.

In some implementations, a recipient positioning module 430 is configured to position, according to the information of the associated account in the retrieved express package delivery content information and from a terminal logging into the associated account, second positioning information of a recipient who can currently receive an express package.

In some implementations, an express package delivery notification module 440 is configured to send a notification for home delivery of the express package to the courier terminal 204 if the second positioning information coincides with the information of the recipient address. The notification sent for home delivery includes the information of the recipient address. In some implementations, the second positioning information coinciding with the information of the recipient address, the recipient address covers a preset range corresponding to the second positioning information. Further, there are one or more accounts associated with the recipient address.

Figure 5:
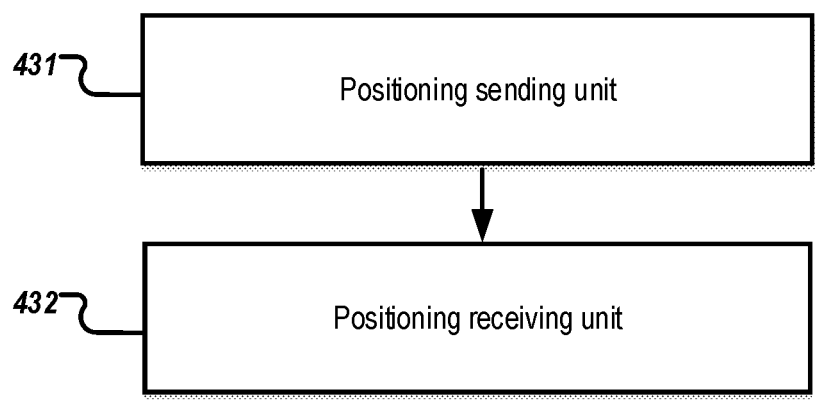
FIG. 5 is another block diagram illustrating an example of a system for express package delivery, according to an implementation of the present disclosure.

FIG. 5 is another block diagram illustrating an example of a system 500 for express package delivery, according to an implementation of the present disclosure. The system 500 includes a positioning sending unit 431 and a positioning receiving unit 432.

In some implementations, a positioning sending unit 431 is configured to send a positioning request to the terminal logging into the associated account 208, to acquire positioning information of a position where the terminal logging into the account is currently located.

In some implementations, a positioning receiving unit 432 is configured to receive the positioning information returned by the terminal logging into the associated account, and use the positioning information as the second positioning information of the recipient who can currently receive the express package.

Figure 6:
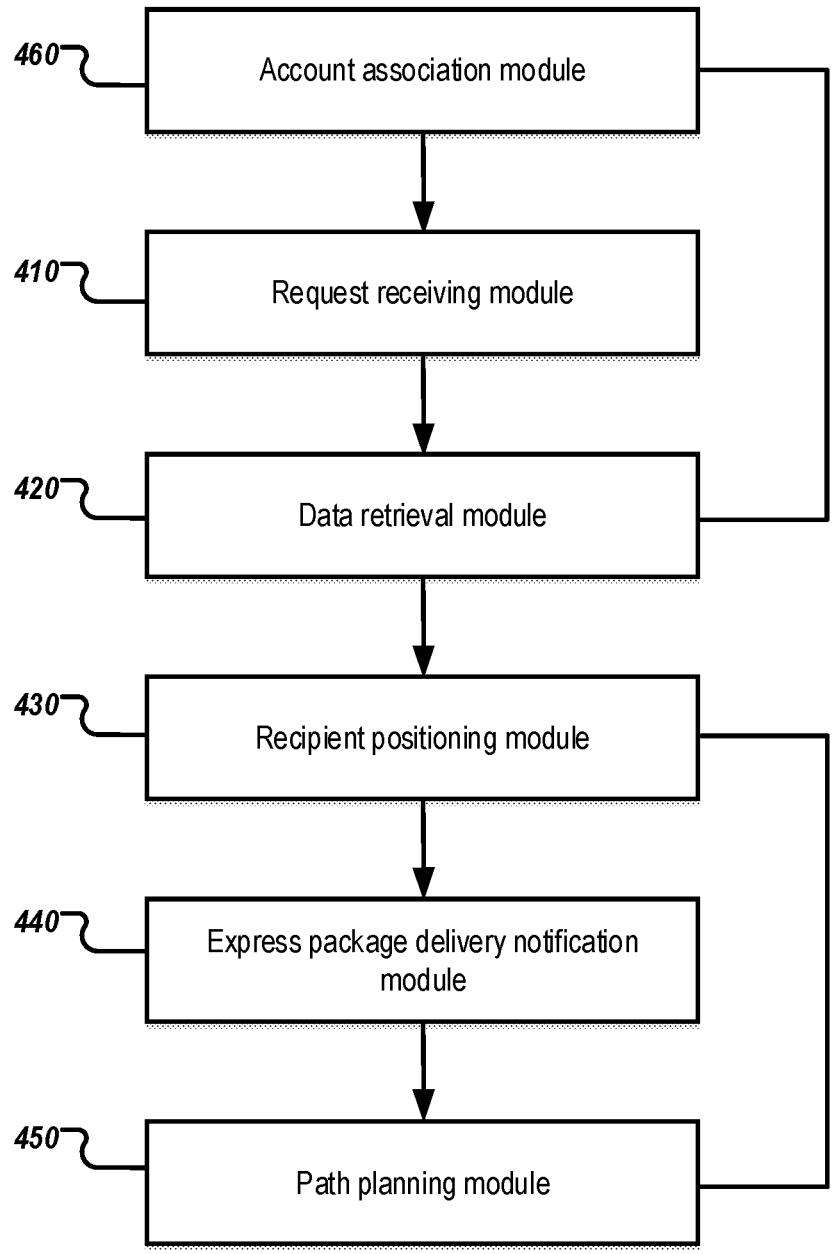
FIG. 6 is another block diagram illustrating an example of a system for express package delivery, according to an implementation of the present disclosure.

FIG. 6 is another block diagram illustrating an example of a system 600 for express package delivery, according to an implementation of the present disclosure. The system 600 includes an account association module 460, a request receiving module 410, a data retrieval module 420, a recipient positioning module 430, an express package delivery notification module 440, and a path planning module 450.

In some implementations, a path planning module 450 is configured to generate information of a planned path of this express package delivery according to the first positioning information and the information of the recipient address after express package sending apparatus 206 determines that the second positioning information coincides with the information of the recipient address. Based on the determination, the express package delivery notification module 440 is further configured to send the information of the planned path to the courier terminal 204.

In some implementations, the express package delivery notification module 440 is further configured to extract, from the second positioning information, second positioning information with a geographical position closest to the information of the recipient address. Additionally, the express package delivery notification module 440 is configured to send the notification for home delivery of the express package to the terminal acquiring the second positioning information through positioning.

In some implementations, the account association module 460 is configured to take, on a purchasing account 228 of the express package and in response to an operation of setting one or more accounts other than the purchasing account for the recipient address in an associated manner, such as the non-purchasing account 226, the purchasing account and each of the other non-purchasing accounts respectively, associated the account with the recipient address.

In some implementations, the express package sending apparatus 206 receives an express package delivery request sent by a courier terminal 204. The express package delivery request includes identifier information of a courier and first positioning information. The express package sending apparatus 206 retrieves express package delivery content information corresponding to a recipient address matching the position where the courier is located from a database 210. The database 210 stores multiple pieces of express package delivery content information. Each of the multiple pieces of express package delivery content information include identifier information of a courier, information of a recipient address, and information of an account associated with the recipient address. The express package sending apparatus 206 positions, according to the information of the associated account in the retrieved express package delivery content information and from a terminal logging into the associated account, second positioning information of a recipient who can currently receive an express package. The express package sending apparatus 206 sends a notification for home delivery of the express package to the courier terminal 204 if the second positioning information is coincident with the information of the recipient address. The notification includes the information of the recipient address. As a result, the cost of communication between a courier and a recipient is reduced, the delivery efficiency is enhanced, and the recipient is enabled to enjoy the experience of receiving express packages at home.

Figure 7:
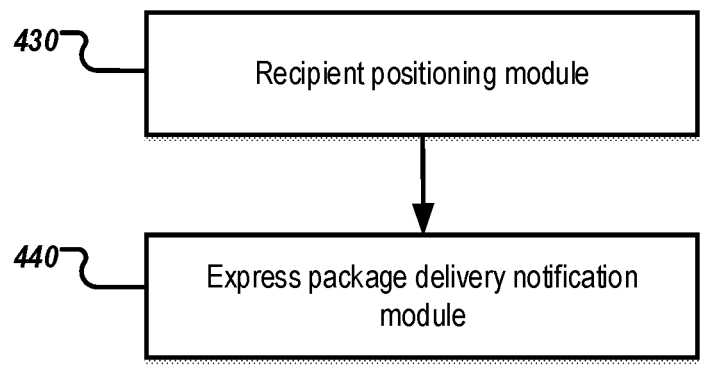
FIG. 7 is another block diagram illustrating an example of a system for express package delivery, according to an implementation of the present disclosure.

FIG. 7 is another block diagram illustrating an example of a system for express package delivery, according to an implementation of the present disclosure.

In some implementations, the recipient positioning module 430 is configured to position, according to the information of the associated account in the retrieved express package delivery content information and from a terminal logging into the associated account, second positioning information of a recipient who can currently receive an express package. The database 210 stores multiple pieces of express package delivery content information. Each of the multiple pieces of express package delivery content information include identifier information of a courier, information of a recipient address, and information of an account associated with the recipient address.

In some implementations, the express package delivery notification module 440 is configured to send a notification for home delivery of the express package to a courier terminal 204 according to identifier information of a courier if the second positioning information is coincident with information of a recipient address, the notification including the information of the recipient address.

The express package sending apparatus provided in this embodiment is a simplification of the apparatus shown in FIG. 4, which directly positions, according to information of an associated account in each piece of express package delivery content information 224 in a database 210 and from a terminal logging into the associated account, second positioning information of a recipient who can currently receive an express package, and sends a notification for home delivery of the express package to the courier terminal 204 according to the identifier information of the courier in the express package delivery content information if the second positioning information is coincident with the information of the recipient address, the notification including the information of the recipient address. The cost of communication between a courier and a recipient is thereby reduced, the delivery efficiency is enhanced, and the recipient is able to enjoy receiving express packages at home.

Figure 8:
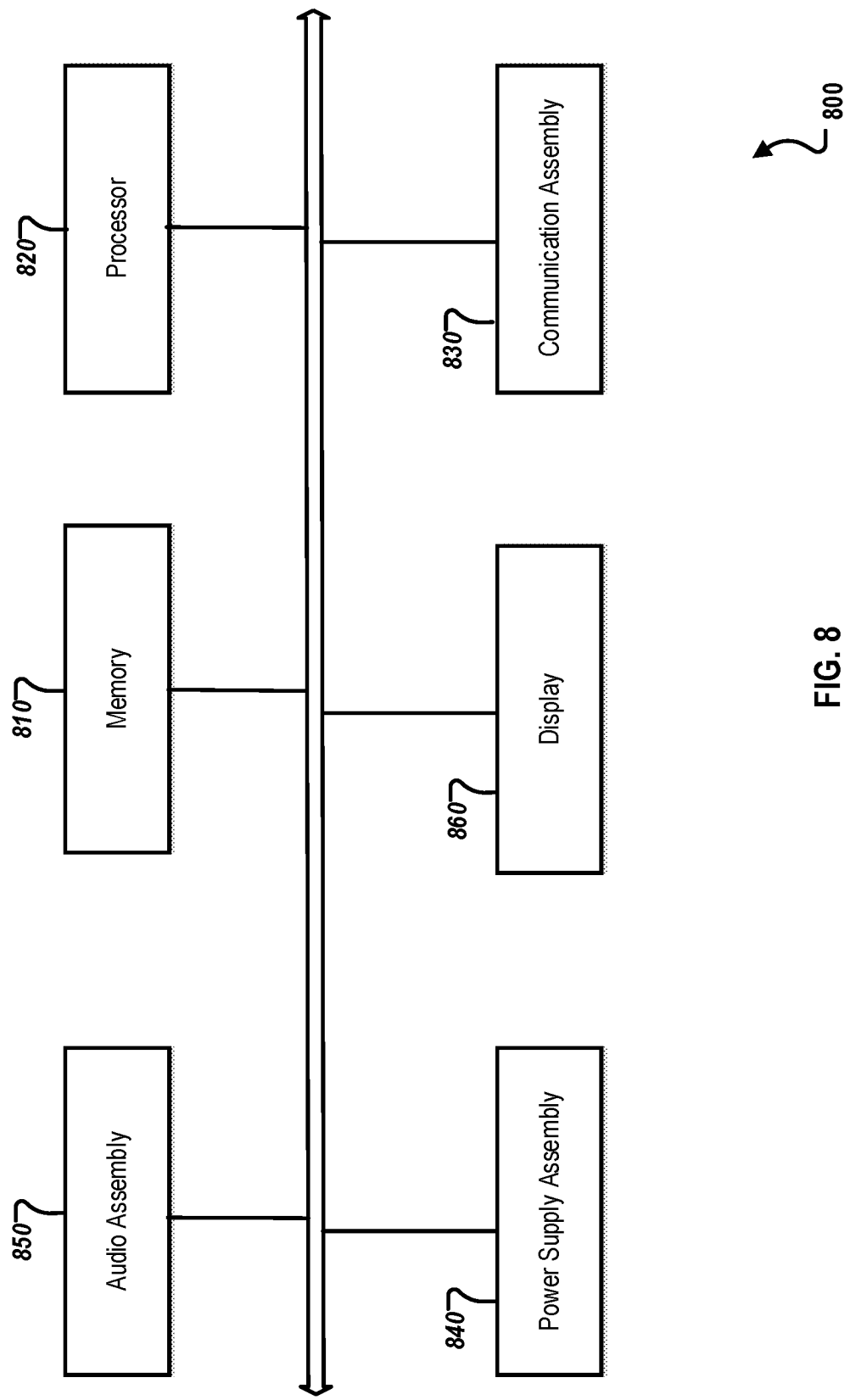
FIG. 8 is a block diagram illustrating an example of an electronic device for express package delivery, according to an implementation of the present disclosure.

FIG. 8 is a block diagram illustrating an example of an electronic device 800 for express package delivery, according to an implementation of the present disclosure. The electronic device 800 includes a memory 810 and a processor 820. The memory 810 is configured to store a program.

In addition to the above program, the memory 810 may further be configured to store other various data for supporting operations on the electronic device. Examples of the data include any application or method instructions, contact data, phone book data, messages, pictures, or videos that are operated on the electronic device.

The memory 810 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read only memory (ROM), a magnetic memory, a flash memory, a magnetic disk, or an optical disc.

The processor 820 is coupled to the memory 810 and configured to execute the program in the memory 810 for: receiving an express package delivery request sent by a courier terminal, the express package delivery request including identifier information of a courier and first positioning information indicating a position where the courier is located; retrieving, from a database, express package delivery content information corresponding to a recipient address matching the position where the courier is located according to the identifier information of the courier and the first positioning information, the database storing multiple pieces of express package delivery content information, and each of the multiple pieces of express package delivery content information including identifier information of a courier, information of a recipient address, and information of an account associated with the recipient address; positioning, according to the information of the associated account in the retrieved express package delivery content information and from a terminal logging into the associated account, second positioning information of a recipient who can currently receive an express package; and sending a notification for home delivery of the express package to the courier terminal if the second positioning information is coincident with the information of the recipient address, the notification including the information of the recipient address.

Further, as shown in FIG. 8, the electronic device further includes: a communication assembly 830, a power supply assembly 840, an audio assembly 850, a display 860, and other assemblies. FIG. 8 merely illustratively shows some of the assemblies, which does not indicate that the electronic device only includes the assemblies shown in FIG. 8.

The communication assembly 830 is configured to facilitate wired or wireless communication between the electronic device and other devices. The electronic device may be connected to a wireless network based on a communication standard, such as WiFi, 2G or 3G, or a combination thereof. In an exemplary embodiment, the communication assembly 830 receives broadcast signals or broadcast related information from an external broadcast management system via a broadcast channel. In an exemplary embodiment, the communication assembly 830 may further include a near field communication (NFC) module configured to prompt short-range communication. For example, the NFC module may be implemented based on the radio frequency identification (RFID) technology, infrared data association (IrDA) technology, ultra wideband (UWB) technology, Bluetooth (BT) technology, and other technologies.

The power supply assembly 840 is configured to supply power to various assemblies of the electronic device. The power supply assembly 840 may include a power management system, one or more power supplies, and other assemblies associated with generation, management, and power distribution of the electronic device.

The audio assembly 850 is configured to output and/or input an audio signal. For example, the audio component 850 includes a microphone (MIC) configured to receive an external audio signal when the electronic device is in an operating mode, such as a calling mode, a recording mode, and a speech recognition mode. The received audio signal may further be stored in the memory 810 or sent by the communication assembly 830. In some embodiments, the audio assembly 850 further includes a loudspeaker configured to output an audio signal.

The display 860 includes a screen which may include a liquid crystal display (LCD) and a touch panel (TP). If the screen includes a touch panel, the screen may be implemented as a touch screen configured to receive an input signal from a user. The touch panel includes one or more touch sensors configured to sense touch, slide, and gestures on the touch panel. The touch sensor can not only sense a boundary of the touch or slide action, but also detect a duration and a pressure related to the touch or slide operation.

Figure 9:
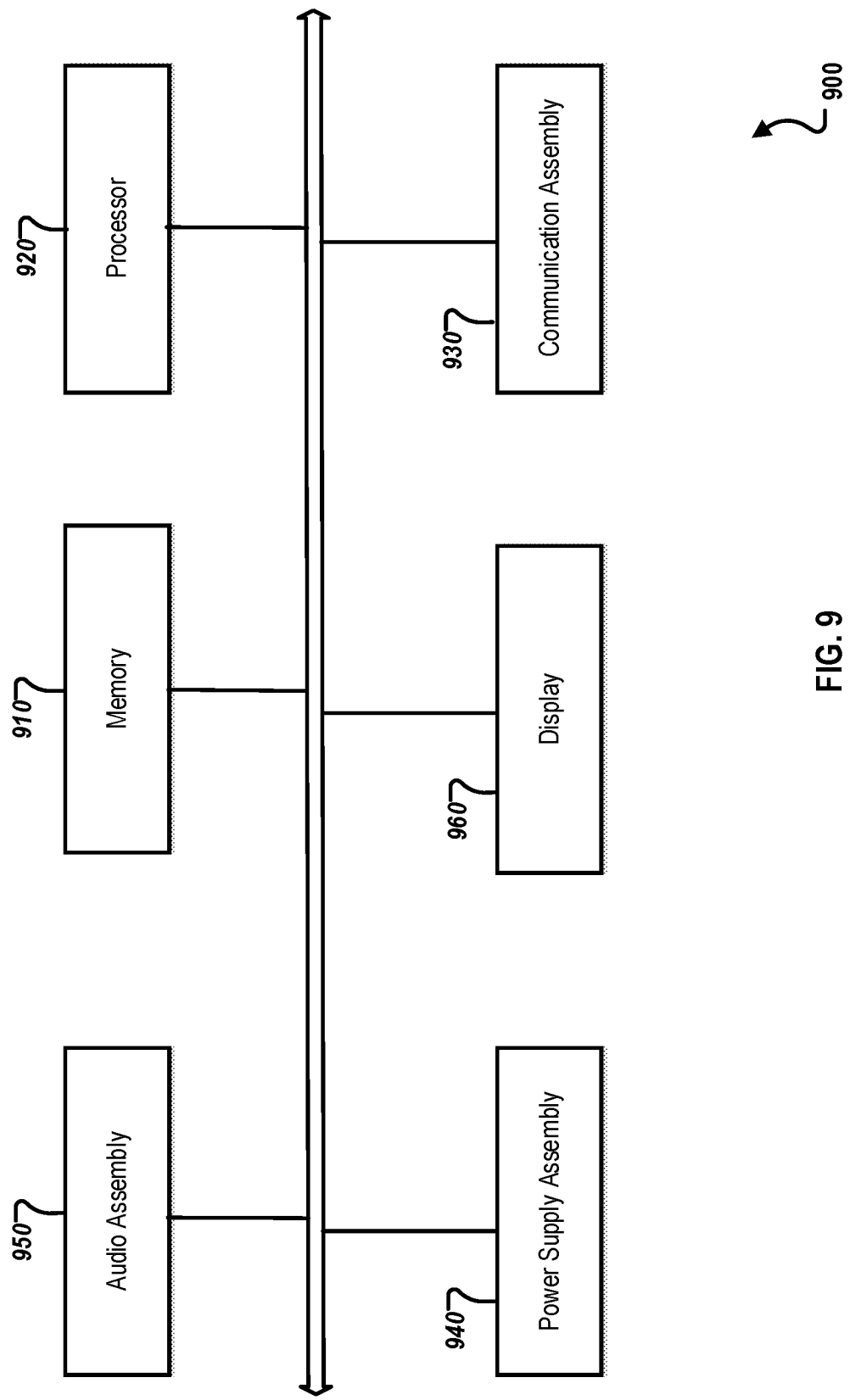
FIG. 9 is another block diagram illustrating an example of an electronic device for express package delivery, according to an implementation of the present disclosure.

FIG. 9 is another block diagram illustrating an example of an electronic device 900 for express package delivery, according to an implementation of the present disclosure. The electronic device 900 includes a memory 910 and a processor 920. The memory 910 is configured to store a program.

In addition to the above program, the memory 910 may further be configured to store other various data for supporting operations on the electronic device. Examples of the data include any application or method instructions, contact data, phone book data, messages, pictures, or videos that are operated on the electronic device.

The memory 910 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read only memory (ROM), a magnetic memory, a flash memory, a magnetic disk, or an optical disc.

The processor 920 is coupled to the memory 910 and configured to execute the program in the memory 910 for: positioning, according to information of an associated account in express package delivery content information stored in a database and from a terminal logging into the associated account, second positioning information of a recipient who can currently receive an express package, the database storing multiple pieces of express package delivery content information, and each of the multiple pieces of express package delivery content information including identifier information of a courier, information of a recipient address, and information of an account associated with the recipient address; and sending a notification for home delivery of the express package to the courier terminal according to the identifier information of the courier if the second positioning information is coincident with the information of the recipient address, the notification including the information of the recipient address.

Further, as shown in FIG. 9, the electronic device may further include: a communication assembly 930, a power supply assembly 940, an audio assembly 950, a display 960, and other assemblies. FIG. 9 merely illustratively shows some of the assemblies, which does not indicate that the electronic device only includes the assemblies shown in FIG. 9.

The communication assembly 930 is configured to facilitate wired or wireless communication between the electronic device and other devices. The electronic device may be connected to a wireless network based on a communication standard, such as WiFi, 2G or 3G, or a combination thereof. In an exemplary embodiment, the communication assembly 930 receives broadcast signals or broadcast related information from an external broadcast management system via a broadcast channel. In an exemplary embodiment, the communication assembly 930 may further include a near field communication (NFC) module configured to prompt short-range communication. For example, the NFC module may be implemented based on the radio frequency identification (RFID) technology, infrared data association (IrDA) technology, ultra wideband (UWB) technology, Bluetooth (BT) technology, and other technologies.

The power supply assembly 940 is configured to supply power to various assemblies of the electronic device. The power supply assembly 940 may include a power management system, one or more power supplies, and other assemblies associated with generation, management, and power distribution of the electronic device.

The audio assembly 950 is configured to output and/or input an audio signal. For example, the audio component 950 includes a microphone (MIC) configured to receive an external audio signal when the electronic device is in an operating mode, such as a calling mode, a recording mode, and a speech recognition mode. The received audio signal may further be stored in the memory 910 or sent by the communication assembly 930. In some embodiments, the audio assembly 950 further includes a loudspeaker configured to output an audio signal.

The display 960 includes a screen which may include a liquid crystal display (LCD) and a touch panel (TP). If the screen includes a touch panel, the screen may be implemented as a touch screen configured to receive an input signal from a user. The touch panel includes one or more touch sensors configured to sense touch, slide, and gestures on the touch panel. The touch sensor can not only sense a boundary of the touch or slide action, but also detect a duration and a pressure related to the touch or slide action.

Figure 10:
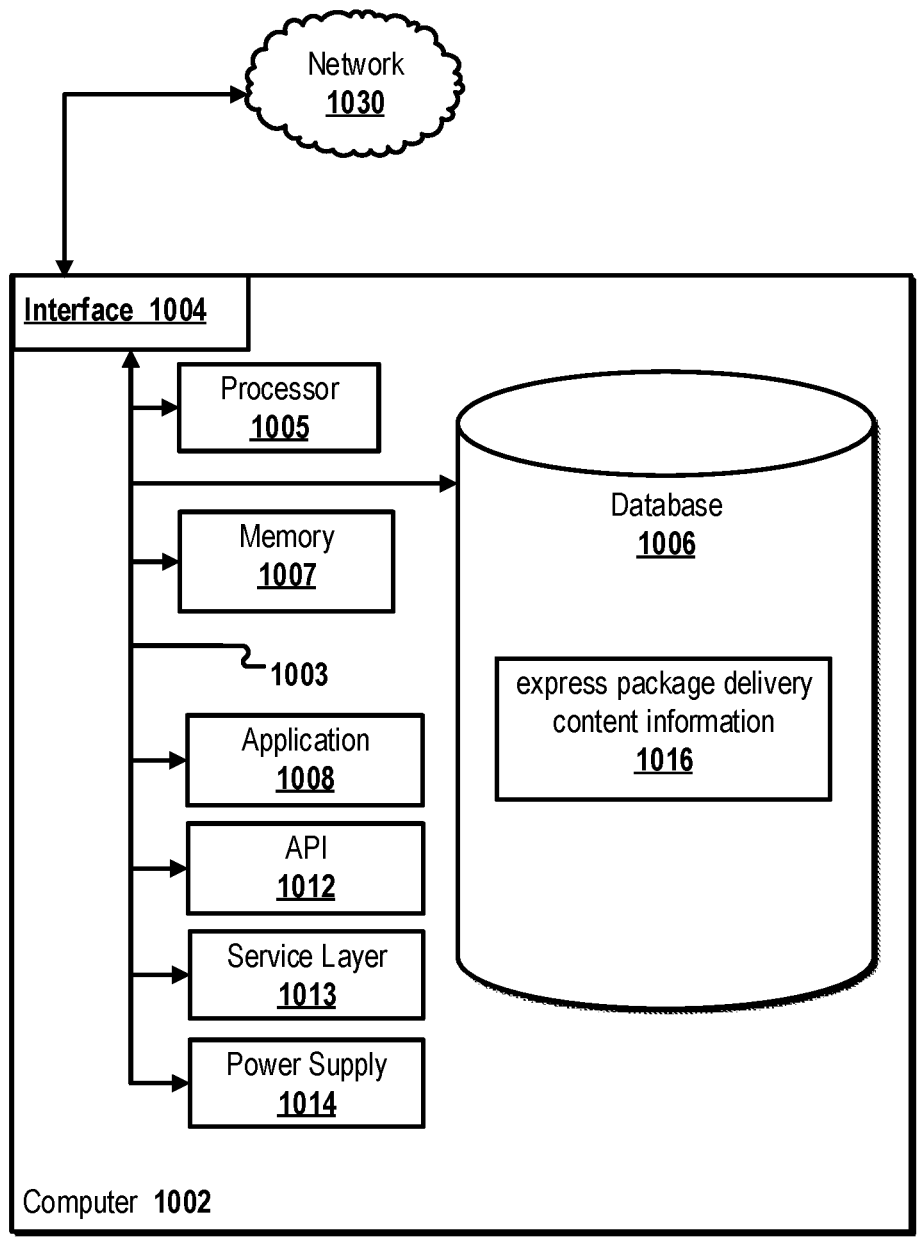
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some implementations, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some implementations, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 703. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. As illustrated, the Database 706 holds the previously described express package delivery content information 1016.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method, comprising: receiving, from a courier terminal, an express package delivery request that indicates identifier information of a courier and first positioning information corresponding to a location of the courier; retrieving, at a database, express package delivery content information corresponding to a recipient address; determining the identifier information of the courier and the first positioning information corresponding to the location of the courier is within proximity to the retrieved recipient address; determining second positioning information of a recipient that can receive an express package corresponding to an account in the retrieved express package delivery content information; and, providing, to the courier terminal, a notification to deliver the express package identified in the express package delivery request if the determined second positioning information of the recipient coincides with the retrieved recipient address.

The foregoing and other described implementations can each, optionally, include one or more of the following features:

A first feature, combinable with any of the following features, wherein the database stores multiple express package delivery requests comprising identifier information of multiple couriers, information of multiple recipient addresses, and information of an account associated with the recipient address.

A second feature, combinable with any of the previous or following features, further comprises generating information of a planned path for the express package delivery request according to the first positioning information and the retrieved recipient in response to determining the second positioning information coincides with the retrieved recipient address.

A third feature, combinable with any of the previous or following features, further comprises providing the information of the generated planned path to the courier terminal to deliver the express package to the retrieved recipient address.

A fourth feature, combinable with any of the previous or following features, wherein determining second positioning information of the recipient that can receive the express package further comprises extracting, from the second positioning information, information with a geographical position closest to the information of the retrieved recipient address.

A fifth feature, combinable with any of the previous or following features, wherein the second positioning information of the recipient coincides with the retrieved recipient address further comprises determining the recipient address coincides within a present range of the second positioning information.

A sixth feature, combinable with any of the previous or following features, wherein the identifier information of the courier comprises the telephone number of the courier terminal.

In a second implementation, a non-transitory, computer-readable medium storing one or more instructions executable by a computer system to perform operations comprising: receiving, from a courier terminal, an express package delivery request that indicates identifier information of a courier and first positioning information corresponding to a location of the courier; retrieving, at a database, express package delivery content information corresponding to a recipient address; determining the identifier information of the courier and the first positioning information corresponding to the location of the courier is within proximity to the retrieved recipient address; determining second positioning information of a recipient that can receive an express package corresponding to an account in the retrieved express package delivery content information; and providing, to the courier terminal, a notification to deliver the express package identified in the express package delivery request if the determined second positioning information of the recipient coincides with the retrieved recipient address.

The foregoing and other described implementations can each, optionally, include one or more of the following features:

A first feature, combinable with any of the following features, wherein the database stores multiple express package delivery requests comprising identifier information of multiple couriers, information of multiple recipient addresses, and information of an account associated with the recipient address.

A second feature, combinable with any of the previous or following features, further comprises generating information of a planned path for the express package delivery request according to the first positioning information and the retrieved recipient in response to determining the second positioning information coincides with the retrieved recipient address.

A third feature, combinable with any of the previous or following features, further comprises providing the information of the generated planned path to the courier terminal to deliver the express package to the retrieved recipient address.

A fourth feature, combinable with any of the previous or following features, wherein determining second positioning information of the recipient that can receive the express package further comprises extracting, from the second positioning information, information with a geographical position closest to the information of the retrieved recipient address.

A fifth feature, combinable with any of the previous or following features, wherein the second positioning information of the recipient coincides with the retrieved recipient address further comprises determining the recipient address coincides within a present range of the second positioning information.

A sixth feature, combinable with any of the previous or following features, wherein the identifier information of the courier comprises the telephone number of the courier terminal.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, from a courier terminal, an express package delivery request that indicates identifier information of a courier and first positioning information corresponding to a location of the courier; retrieving, at a database, express package delivery content information corresponding to a recipient address; determining the identifier information of the courier and the first positioning information corresponding to the location of the courier is within proximity to the retrieved recipient address; determining second positioning information of a recipient that can receive an express package corresponding to an account in the retrieved express package delivery content information; and providing, to the courier terminal, a notification to deliver the express package identified in the express package delivery request if the determined second positioning information of the recipient coincides with the retrieved recipient address.

The foregoing and other described implementations can each, optionally, include one or more of the following features:

A first feature, combinable with any of the following features, wherein the database stores multiple express package delivery requests comprising identifier information of multiple couriers, information of multiple recipient addresses, and information of an account associated with the recipient address.

A second feature, combinable with any of the previous or following features, further comprises generating information of a planned path for the express package delivery request according to the first positioning information and the retrieved recipient in response to determining the second positioning information coincides with the retrieved recipient address.

A third feature, combinable with any of the previous or following features, further comprises providing the information of the generated planned path to the courier terminal to deliver the express package to the retrieved recipient address.

A fourth feature, combinable with any of the previous or following features, wherein determining second positioning information of the recipient that can receive the express package further comprises extracting, from the second positioning information, information with a geographical position closest to the information of the retrieved recipient address.

A fifth feature, combinable with any of the previous or following features, wherein the second positioning information of the recipient coincides with the retrieved recipient address further comprises determining the recipient address coincides within a present range of the second positioning information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving, from a courier terminal, an express package delivery request that indicates identifier information of a courier and first positioning information corresponding to a location of the courier;
    retrieving, at a database, express package delivery content information corresponding to a recipient address;
    determining the identifier information of the courier and the first positioning information corresponding to the location of the courier is within proximity to the recipient address, wherein the recipient address is associated with more than one account;
    determining more than one user device that is logged in the more than one account;
    constantly updating second positioning information of more than one recipient that can receive an express package based on positioning information of the more than one user device;
    providing, to the courier terminal, a notification to deliver the express package identified in the express package delivery request in response to determining that the recipient address is within a preset range of the second positioning information of at least one of the more than one recipient;
    determining one recipient of the more than one recipient with a geographical position closest to the recipient address based on the second positioning information of the more than one recipient; and
    transmitting a notification of home delivery of the express package to a user device associated with the one recipient of the more than one recipient.

2. The computer-implemented method of claim 1, wherein the database stores multiple express package delivery requests comprising identifier information of multiple couriers, information of multiple recipient addresses, and information of the more than one account associated with the recipient address.

3. The computer-implemented method of claim 1, further comprises generating information of a planned path for the express package delivery request according to the first positioning information and the recipient address in response to determining the second positioning information is within the preset range of the recipient address.

4. The computer-implemented method of claim 3, further comprises providing the information of the generated planned path to the courier terminal to deliver the express package to the recipient address.

5. The computer-implemented method of claim 1, wherein the identifier information of the courier comprises a telephone number of the courier terminal.

6. A non-transitory, computer-readable medium storing one or more instructions executable by a computer system to perform operations comprising:

receiving, from a courier terminal, an express package delivery request that indicates identifier information of a courier and first positioning information corresponding to a location of the courier;

retrieving, at a database, express package delivery content information corresponding to a recipient address;

determining the identifier information of the courier and the first positioning information corresponding to the location of the courier is within proximity to the recipient address, wherein the recipient address is associated with more than one account;

determining more than one user device that is logged in the more than one account;

constantly updating second positioning information of more than one recipient that can receive an express package based on positioning information of the more than one user device;

providing, to the courier terminal, a notification to deliver the express package identified in the express package delivery request in response to determining that the recipient address is within a preset range of the second positioning information of at least one of the more than one recipient;

determining one recipient of the more than one recipient with a geographical position closest to the recipient address based on the second positioning information of the more than one recipient; and transmitting a notification of home delivery of the express package to a user device associated with the one recipient of the more than one recipient.

7. The computer-readable medium of claim 6, wherein the database stores multiple express package delivery requests comprising identifier information of multiple couriers, information of multiple recipient addresses, and information of the more than one account associated with the recipient address.

8. The computer-readable medium of claim 6, further comprises generating information of a planned path for the express package delivery request according to the first positioning information and the recipient address in response to determining the second positioning information is within the preset range of the recipient address.

9. The computer-readable medium of claim 8, further comprises providing the information of the generated planned path to the courier terminal to deliver the express package to the recipient address.

10. The computer-readable medium of claim 6, wherein the identifier information of the courier comprises a telephone number of the courier terminal.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, from a courier terminal, an express package delivery request that indicates identifier information of a courier and first positioning information corresponding to a location of the courier;

retrieving, at a database, express package delivery content information corresponding to a recipient address;

determining the identifier information of the courier and the first positioning information corresponding to the location of the courier is within proximity to the recipient address, wherein the recipient address is associated with more than one account;

determining more than one user device that is logged in the more than one account;

constantly updating second positioning information of more than one recipient that can receive an express package based on positioning information of the more than one user device;

providing, to the courier terminal, a notification to deliver the express package identified in the express package delivery request in response to determining that the recipient address is within a preset range of the second positioning information of at least one of the more than one recipient;

determining one recipient of the more than one recipient with a geographical position closest to the recipient address based on the second positioning information of the more than one recipient; and transmitting a notification of home delivery of the express package to a user device associated with the one recipient of the more than one recipient.

12. The computer-implemented system of claim 11, wherein the database stores multiple express package delivery requests comprising identifier information of multiple couriers, information of multiple recipient addresses, and information of the more than one account associated with the recipient address.

13. The computer-implemented system of claim 11, further comprises generating information of a planned path for the express package delivery request according to the first positioning information and the recipient address in response to determining the second positioning information is within the preset range of the recipient address.

14. The computer-implemented system of claim 13, further comprises providing the information of the generated planned path to the courier terminal to deliver the express package to the recipient address.

* * * * *